(12) United States Patent
Rodrigues et al.

(10) Patent No.: US 7,747,615 B2
(45) Date of Patent: *Jun. 29, 2010

(54) SYSTEM FOR COLOR MATCH AND DIGITAL COLOR DISPLAY

(75) Inventors: Allan Blase Joseph Rodrigues, Bloomfield Hills, MI (US); Gerard T. Brosmer, Wilmington, DE (US); Daniel A. Benton, Wilmington, DE (US); Larry Eugene Steenhoek, Wilmington, DE (US); Robert Vincent Canning, Jr., Bear, DE (US); Marko Strukelj, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 53 days.

This patent is subject to a terminal disclaimer.

(21) Appl. No.: 12/079,708

(22) Filed: Mar. 28, 2008

(65) Prior Publication Data

US 2008/0291449 A1    Nov. 27, 2008

Related U.S. Application Data

(60) Provisional application No. 60/921,120, filed on Mar. 29, 2007.

(51) Int. Cl.
*G06F 17/30* (2006.01)
(52) U.S. Cl. .............. 707/722; 707/706; 707/758
(58) Field of Classification Search ............ 707/1–10, 707/100
See application file for complete search history.

(56) References Cited

U.S. PATENT DOCUMENTS

| | | | | | |
|---|---|---|---|---|---|
| 4,692,481 | A | * | 9/1987 | Kelly | 523/219 |
| 5,153,825 | A | * | 10/1992 | Yauk et al. | 705/1 |
| 6,113,838 | A | * | 9/2000 | Flynn et al. | 264/510 |
| 6,539,325 | B1 | * | 3/2003 | Numata et al. | 702/127 |
| 7,337,162 | B2 | * | 2/2008 | Lewis | 707/3 |

* cited by examiner

*Primary Examiner*—Cam-Linh Nguyen
(74) *Attorney, Agent, or Firm*—Gann G Xu

(57) ABSTRACT

The present invention is directed to a system for digital displaying images of various colors and appearances of an article and the use thereof. The invention is particularly directed to a system for displaying images for selecting one or more matching formulas to match color and appearance of an article. The invention is even further directed to a system for displaying images for selecting one or more matching formulas to match color and appearance of a target coating of a vehicle.

36 Claims, 13 Drawing Sheets

SYSTEM FOR COLOR MATCH AND DIGITAL COLOR DISPLAY

CROSS-REFERENCE TO RELATED APPLICATION

This application claims priority under 35 U.S.C. §119 from U.S. Provisional Application Ser. No. 60/921,120 (filed Mar. 29, 2007), the disclosure of which is incorporated by reference herein for all purposes as if fully set forth.

FIELD OF INVENTION

The present invention is directed to a system for digital displaying images of various colors and appearances of an article and the use thereof. The invention is particularly directed to a system for displaying images for selecting one or more matching formulas to match color and appearance of an article. The invention is even further directed to a system for displaying images for selecting one or more matching formulas to match color and appearance of a target coating of a vehicle.

BACKGROUND OF INVENTION

Surface coatings such as monocoat, clearcoat/colorcoat, and tricoat are favored for the protection and decoration of substrates such as vehicle bodies. The surface coatings can utilize one or more pigments or effect pigments to impart the desired color or appearance, such as solid, metallic, pearlescent effect, gloss, or distinctness of image, to the vehicle bodies. Metallic flakes, such as aluminum flakes are commonly used to produce coatings having flake appearances such as texture, sparkle, glint and glitter as well as the enhancement of depth perception in the coatings imparted by the flakes.

Repair of such coatings that have been damaged, e.g., in a collision or stone chipping or scratches, has been difficult in that a vehicle repair body shop or a refinisher may have to go to great lengths to repeatedly try out and to locate a best aftermarket refinish coating composition that matches the color and appearance of the vehicle's original coating, also known as original equipment manufacturing (OEM) coating. While each coating composition used in a vehicle's original coating is manufactured to a given color standard, so that, in theory, all vehicles painted with a given coating composition should appear the same color and appearance, due to a host of different variables, such as changing atmospheric conditions and use of different application techniques, the appearance of a given coating composition may actually vary from plant to plant and over different times of any year. Consequently, vehicles manufactured at one plant may appear a different color than vehicles painted with the same coating composition at another plant. A number of refinish matching coating compositions must therefore be developed for each OEM coating composition. Presently there is no quick, easy and inexpensive way to determine which aftermarket matching refinish coating composition is the best match in color and appearance for a particular OEM coating.

Various color matching techniques have been developed in the past to aid the selection of the correct matching coating composition to refinish a vehicle, but all suffer from certain significant limitations. For instance, visual tools such as refinish color chips have been used on many occasions to find a suitable match for the vehicle that needs refinishing. However, visual color matching is time-consuming, cumbersome and subject to many errors as a result of poor lighting conditions, operator variances, or variation to the original standard by the paint manufacturer. Another system involves the use of vehicle data, such as its make, model year and manufacturer's paint code. The paint code is used to identify all the different aftermarket refinish matching coating compositions and corresponding coating formulas created for that paint code. Additional information further defining the matching coatings resulted from the matching coating compositions is associated to each formula which helps the refinisher define which is the best match for the vehicle of that make and model year in question. Such information is gathered from a number of sources and resides in either electronic or printed formats. Accessing such a bank of information is very time-consuming and does not always lead to the correct coating match.

A further system commonly employed involves the use of a computer controlled colorimeter or spectrophotometer which measures the color values of an undamaged area of the coating on the vehicle and compares these color values stored in a database that contains color data for various refinish matching coatings and corresponding matching formulas. From that comparison, the computer locates one or more preliminary matching formulas for the vehicle's original coating color and appearance within an acceptable tolerance. An example of such method was disclosed in U.S. Pat. No. 7,145,656. Said method, however, requires measured color values and cannot identify matching formulas based on vehicle identification information.

An even further development is to use both the measured color values and vehicle identifying information to locate potential preliminary matching formulas from a refinish matching coating database. One example of such system was disclosed in U.S. Pat. No. 6,522,977. In such system, sample coatings resulting from each of the preliminary matching formulas are prepared and test sprayed. Color match is then visually determined. In most cases, the preliminary matching formulas need to be adjusted manually and repeatedly by trial and error until a match is achieved.

Thus, a continuing need still exists for a method and a system to select one or more matching formulas to match color and appearance of an article, and particularly, for matching the coating of a vehicle that needs refinishing, with minimum requirement for repeated testing, manual adjustment and trial.

STATEMENT OF INVENTION

This invention is directed to a system for displaying one or more images to select one or more matching formulas to match color and appearance of an article, said system comprising:
 a) a computing device;
 b) a display device;
 c) one or more data input devices;
 d) a database comprising interrelated repair formulas, color characteristics, and optionally appearance characteristics; and
 e) a computer program product that is accessible to the computing device and performs a computing process comprising the steps of:
  i. retrieving one or more preliminary matching formulas from the database based on signals received from the data input device;
  ii. generating individual matching images based on the color characteristics, and optionally appearance characteristics interrelated to each of the preliminary matching formulas; and iii. displaying the individual matching images on the display device.

This invention is also directed to a system for displaying one or more images to select one or more matching formulas to match color and appearance of an article, said system comprising:
a) a computing device;
b) a display device;
c) one or more data input devices;
d) a database comprising interrelated repair formulas, identification information of articles, color characteristics, and optionally appearance characteristics; and
e) a computer program product that is accessible to the computing device and performs a computing process comprising the steps of:
  i. receiving from the one or more input devices identification information of the article;
  ii. retrieving one or more preliminary matching formulas from the database that match the identification information;
  iii. generating individual matching images based on the color characteristics, and optionally appearance characteristics interrelated to each of the preliminary matching formulas; and
  iv. displaying the individual matching images on the display device.

This invention is further directed to a system for displaying one or more images to select one or more matching formulas to match color and appearance of a target coating of an article, said system comprising:
a) a computing device;
b) a display device;
c) one or more data input devices;
d) a database comprising interrelated repair formulas, color characteristics, and optionally appearance characteristics; and
e) a computer program product that is accessible to the computing device and performs a computing process comprising the steps of:
  i. retrieving one or more preliminary matching formulas from the database based on signals received from the data input device;
  ii. generating individual matching images based on the color characteristics, and optionally appearance characteristics interrelated to each of the preliminary matching formulas; and
  iii. displaying the individual matching images on the display device.

This invention is even further directed to a system for displaying one or more images to select one or more matching formulas to match color and appearance of a target coating of an article, said system comprising:
a) a computing device;
b) a display device;
c) one or more data input devices;
d) a database comprising interrelated repair formulas, identification information of articles, color characteristics, and optionally appearance characteristics; and
e) a computer program product that is accessible to the computing device and performs a computing process comprising the steps of:
  i. receiving from the one or more input devices identification information of the article;
  ii. retrieving one or more preliminary matching formulas from the database that match the identification information;
  iii. generating individual matching images based on the color characteristics, and optionally appearance characteristics interrelated to each of the preliminary matching formulas; and
  iv. displaying the individual matching images on the display device.

DETAILED DESCRIPTION

Figure 1A:
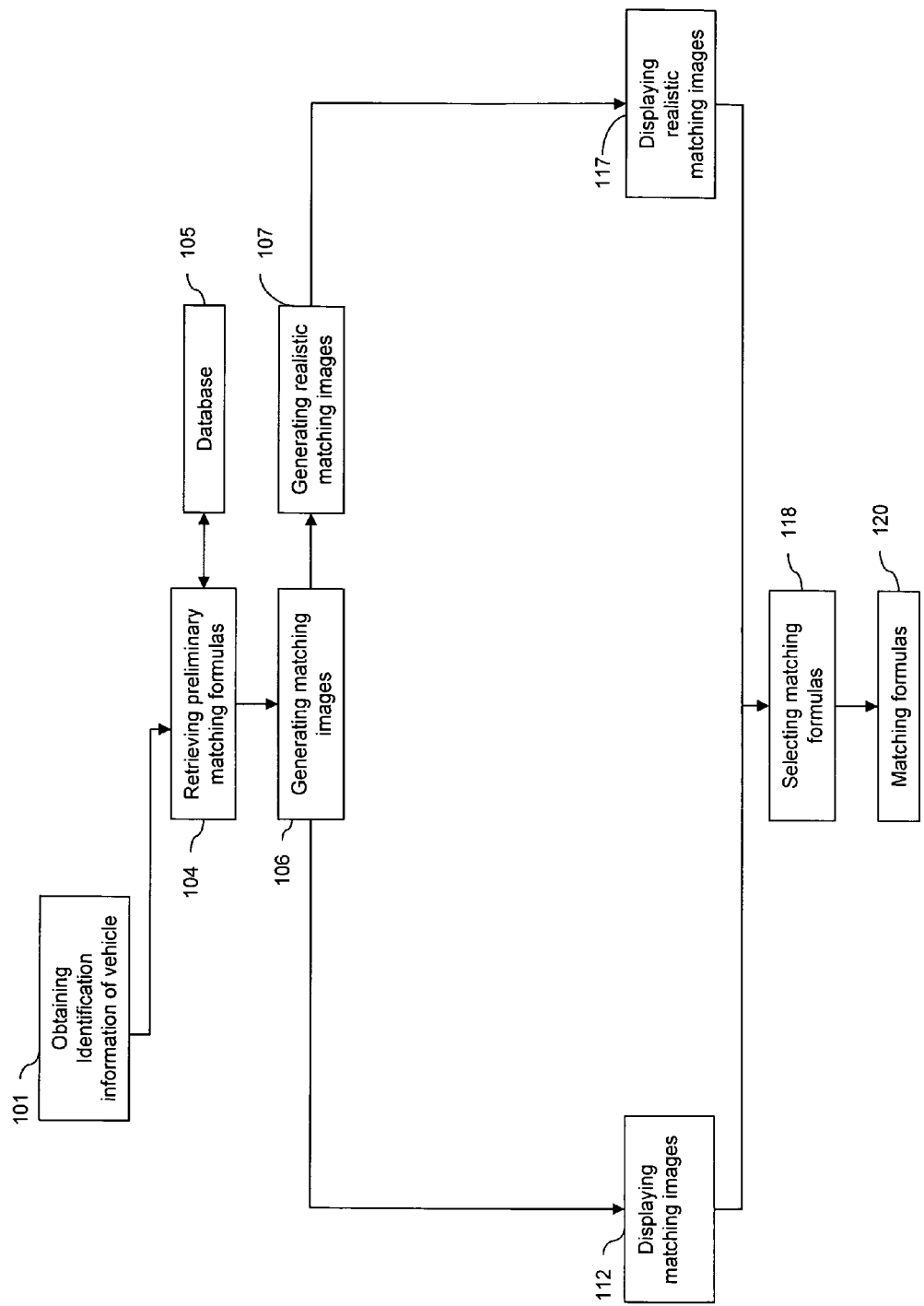
FIG. 1 shows representative flow charts of the method of this invention. (A) Selection of matching formulas based on vehicle identification information. (B) Selection of matching formulas with the target image. (C) Selection of matching formulas without the identification information.

The features and advantages of the present invention will be more readily understood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

The term "pigment" or "pigments" used herein refers to a colorant or colorants that produce color or colors. A pigment can be from natural and synthetic sources and made of organic or inorganic constituents. A pigment also includes metallic particles or flakes with specific or mixed shapes and dimensions. A pigment is usually not soluble in a coating composition.

The term "effect pigment" or "effect pigments" refers to pigments that produce special effects in a coating. Examples of effect pigments include, but not limited to, light scattering pigments, light interference pigments, and light reflecting pigments. Flakes, such as metallic flakes, for example aluminum flakes, are examples of such effect pigments.

Gonioapparent flakes refer to flakes which change color or appearance, or a combination thereof, with change in illumination angle or viewing angle. Metallic flakes, such as aluminum flakes are examples of gonioapparent flakes.

The term "dye" means a colorant or colorants that produce color or colors. Dye is usually soluble in a coating composition.

"Appearance" used herein refers to (1) the aspect of visual experience by which a coating is viewed or recognized; and (2) perception in which the spectral and geometric aspects of a coating is integrated with its illuminating and viewing environment. In general, appearance includes texture, sparkle, or other visual effects of a coating, especially when viewed from varying viewing angles and/or with varying illumination angles.

The term "database" refers to a collection of related information that can be searched and retrieved. The database can be a searchable electronic numerical, alphanumerical or textual document; a searchable PDF document; a Microsoft Excel® spreadsheet; a Microsoft Access® database (both supplied by Microsoft Corporation of Redmond, Wash.); an Oracle® database (supplied by Oracle Corporation of Redwood Shores, Calif.); or a Linux database, each registered under their respective trademarks. The database can be a set of electronic documents, photographs, images, diagrams, or drawings, residing in a computer readable storage media that can be searched and retrieved. A database can be a single database or a set of related databases or a group of unrelated databases. "Related database" means that there is at least one common information element in the related databases that can be used to relate such databases. One example of the related databases can be Oracle® relational databases.

Each of the terms "vehicle", "automotive", "automobile", "automotive vehicle", and "automobile vehicle" refer to an automobile such as car, van, mini van, bus, SUV (sports utility vehicle); truck; semi truck; tractor; motorcycle; trailer; ATV (all terrain vehicle); pickup truck; heavy duty mover, such as, bulldozer, mobile crane and earth mover; airplanes; boats; ships; and other modes of transport that are coated with coating compositions.

A computing device used herein refers to a desktop computer, a laptop computer, a pocket PC, a personal digital assistant (PDA), a handheld electronic processing device, a smart phone that combines the functionality of a PDA and a mobile phone, an iPod, an iPod/MP Player, or any other electronic devices that can process information automatically. A computing device may have a wired or wireless connection to a database or to another computing device. A computing device may be a client computer that communicates with a host computer in a multi-computer client-host system connected via a wired or wireless network including intranet and internet. A computing device can also be configured to be coupled with a data input or output device via wired or wireless connections. For example, a laptop computer can be operatively configured to receive color data and images through a wireless connection. A computing device may further be a subunit of another device. Examples of such a subunit can be a processing chip in an imaging device, a spectrophotometer, or a goniospectrophotometer. A computing device may be connected to a display device, such as a monitor screen. A "portable computing device" includes a laptop computer, a pocket PC, a personal digital assistant (PDA), a handheld electronic processing device, a mobile phone, a smart phone that combines the functionality of a PDA and a mobile phone, a tablet computer, an iPod, an iPod/MP Player, or any other stand alone or subunit devices that can process information and data and can be carried by a person.

Wired connections include hardware couplings, splitters, connectors, cables or wires. Wireless connections and devices include, but not limited to, Wi-Fi device, Bluetooth device, wide area network (WAN) wireless device, Wi-Max device, local area network (LAN) device, 3G broadband device, infrared communication device, optical data transfer device, radio transmitter and optionally receiver, wireless phone, wireless phone adaptor card, or any other devices that can transmit signals in a wide range of electromagnetic wavelengths including radio frequency, microwave frequency, visible or invisible wavelengths.

An imaging device refers to a device that can capture images under a wide range of electromagnetic wavelengths including visible or invisible wavelengths. Examples of the imaging device include, but not limited to, a still film optical camera, a digital camera, an X-Ray camera, an infrared camera, an analog video camera, and a digital video camera. A digital imager or digital imaging device refers to an imaging device captures images in digital signals. Examples of the digital imager include, but not limited to, a digital still camera, a digital video camera, a digital scanner, and a charge coupled device (CCD) camera. An imaging device can capture images in black and white, gray scale, or various color levels. A digital imager is preferred in this invention. Images captured using a non-digital imaging device, such as a still photograph, can be converted into digital images using a digital scanner and can also be suitable for this invention. The imaging device can further comprise an illumination device that provided illuminations at a single or multiple angles.

A display device can be a computer monitor, a projector, a TV screen, a personal digital assistant (PDA) device, a cell phone, a smart phone that combines PDA and cell phone, an iPod, an iPod/MP Player, a flexible thin film display, or any other devices that can display information or images based on digital signals. The display device can also be a printing device that prints, based on digital signals, information or image onto papers, plastics, textiles, or any other surfaces that are suitable for printing the information or images onto. The display device can also be a duel functional display/data input device, such as a touch screen.

The term "repair formula" refers to a collection of information or instruction, based upon that, a repair composition can be prepared. A refinish coating formula is a typical example of the repair formula. A repair formula can also be a formula to repair small damage of a vehicle coating at some points of original manufacturing (OEM) production line wherein a refinish formula has not yet been developed for that particular vehicle. Other examples include, but not limited to, a formula and optionally an instruction to mix and produce a particular engineer polymer with desired color and appearance, or a formula and instruction to mix and produce a composition of desired color and appearance to repair kitchen counter top made from synthetic materials.

Figure 1B:
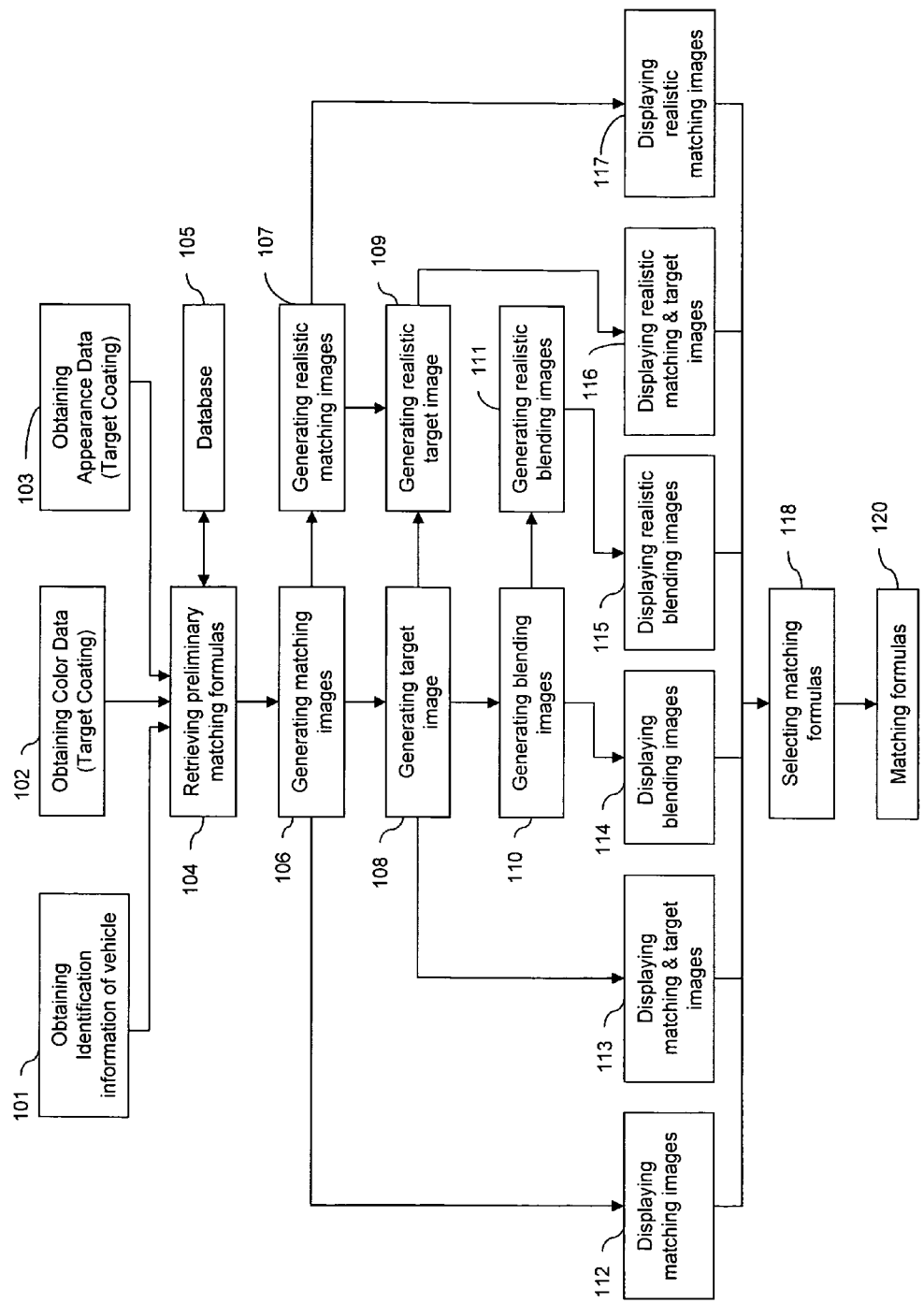

This invention is directed to a system that utilizes a method for displaying images for selecting one or more matching formulas for matching color and appearance of an article, particularly to match a coating of a vehicle. Representative process flow charts of the method are shown in FIG. 1. It is understood that those who skilled in the art may produce variations of the flow charts, rearrange sequential orders of the steps or make other various modifications without departing from the scope and spirit of this invention.

In one embodiment, said method comprises the following steps:

In step (a), identification information of a vehicle is obtained (101, FIG. 1), wherein said identification information comprises model year, manufacturing site information, manufacturer's paint code, and optionally manufacturing date for said vehicle. The identification information can be obtained from vehicle identification number (VIN), vehicle identification label, an optical vehicle data source, an electromagnetic vehicle data source of said vehicle, or a combination thereof. VINs are currently used by all vehicle manufacturers to record relevant information about the vehicle that may be useful later to the vehicle manufacturer, highway safety administrators, insurance investigators, and law enforcement officers, such as make, model, model year, site of manufacture, production sequence, etc. In most countries today, VINs are required by law. For example, today the U.S. government requires all cars and trucks made for U.S. sale to carry a 17-character vehicle identification number, which is made up of a combination of 17 numbers and letters. Detailed descriptions of vehicle identification number is provided in Federal Register, Rules and Regulations, Vol. 16, No. 111, pages 29031-29036, published on Jun. 7, 1996. The VIN can be presented as a string of alphanumeric characters or a barcode which can be entered into a computer using a scanner or barcode reader. Some or all of the identification information may be found on a vehicle identification label affixed to the vehicle body in textual format which can be entered into a computer manually or scanned using a scanner in combination with well known optical character recognition (OCR) software. Optical vehicle data source can be any of the data source mentioned above such as the VIN, the barcode or the label that can be entered into a computer using an optical data device such as a scanner or barcode reader. Examples of the electromagnetic vehicle data source include, but not limited to, on-board diagnostics (OBD) system available in most of modern vehicles which tracks and stores vehicle information and operation data in a computer retrievable form and can be transferred to a computer via a data port known to those skilled in the art. The electromagnetic vehicle data source can also be a passive data storage device such as a memory chip, a disk, or a RFID (radio frequency identification) chip; or an active radio transponder that can transmit vehicle identification data via a broad range of radio frequency and the data can be received by a corresponding receiver. An example of such active radio transponder and receiver can be OBD-II, a new on-board diagnostics (OBD) system standard introduced in the mid-'90s, which is known to those skilled in the art.

In step (b), one or more preliminary matching formulas from a database are retrieved (104) that match the OEM paint code, the model year, the manufacturing site information, and optionally the manufacturing date, wherein said database (105) contains refinish coating formulas interrelated to manufacturer's paint codes, color and appearance characteristics, and alphanumeric characters assigned to each of the refinish coating formulas that indicate the model year and manufacturing site information, and optionally manufacturing date for which the refinish coating formulas are applicable. The process and algorithms for retrieving the preliminary matching formulas based on the vehicle identification was described in detail in a co-pending application U.S. patent application Ser. No. 09/536,137, filed on Mar. 28, 2000, which is incorporated by reference in its entirety.

In step (c), individual images are generated (106) based on the color and appearance characteristics interrelated to each of the preliminary matching formulas and stored in the database (105), herein referred to as individual matching images. The color and appearance characteristics can be obtained through measurements of a test coating resulted from the corresponding formula or through mathematical calculation and modeling. Typically, the color characteristics can comprise L,a,b, or L*,a*,b*, or X,Y,Z values known to those skilled in the art and can be obtained by using a colorimeter, a spectrophotometer, or a goniospectrophotometer. Examples of appearance characteristics include, but not limited to, texture, metallic, pearlescent effect, gloss, distinctness of image, flake appearances such as texture, sparkle, glint and glitter as well as the enhancement of depth perception in the coatings imparted by the flakes, especially produced by metallic flakes, such as aluminum flakes. In one example, flake appearance characteristics can be obtained by measurements, calculations and modeling, or a combination of measurements and calculations as described in a commonly owned U.S. Pat. No. 6,952,265, which is hereby incorporated by reference in its entirety. Color and appearance characteristics may contain one or more illumination angels or view angles. Each coating formula stored in the database can be interrelated to one or more sets of information, such as vehicle identification information, color characteristics, and appearance characteristics. The term "interrelated" refers to a database structure that related information can be searched and retrieved. For example, a coating formula and its color or appearance characteristics can be retrieved based on related vehicle identification information. The same formula and related vehicle identification information, on the other hand, can also be retrieved based on color or appearance characteristics. Color or appearance characteristics, or both color and appearance characteristics can also be retrieved based on vehicle identification information.

General methods for generating images of coating colors on a computer monitor based on variables in coating formulas are known to those skilled in the art, such as the method described in WO 2004/044850. In brief, the images are generated by converting the L,a,b, or L*,a*,b*, values of the color characteristics to XYZ values if needed and calculating corresponding R, G, B values from the XYZ values. The R, G, B values may further be modified or calibrated to fit various display devices.

Images representing multiple viewing angles can be generated (107, FIG. 1), herein referred to as realistic matching images. Methods for generating realistic images of coating color and appearance based on coating formulas and color and appearance characteristics are described in commonly owned U.S. patent application Ser. No. 11/588,471, filed on Oct. 27, 2006, which is incorporated by reference in their entirety. In brief, the images are generated by converting the L,a,b, or L*,a*,b*, values at least three angles to corresponding XYZ values, calculating a range of aspecular angles required for display, and calculating corresponding R, G, B values from the corresponding XYZ values and the angles for display. The R, G, B values may further be modified or calibrated to fit various display devices.

In step (d), the individual matching images (112) or realistic matching images (117) can be displayed on a display device. Each of the matching images can be displayed as an image representing a single viewing angle (22, FIG. 2A) or a realistic matching image representing multiple viewing angles, such as a curved view (32) shown in FIG. 3A. Algorithms and methods for displaying matching images are described in aforementioned U.S. patent application Ser. No. 11/588,471, filed on Oct. 27, 2006, which is incorporated by reference.

Figure 5:
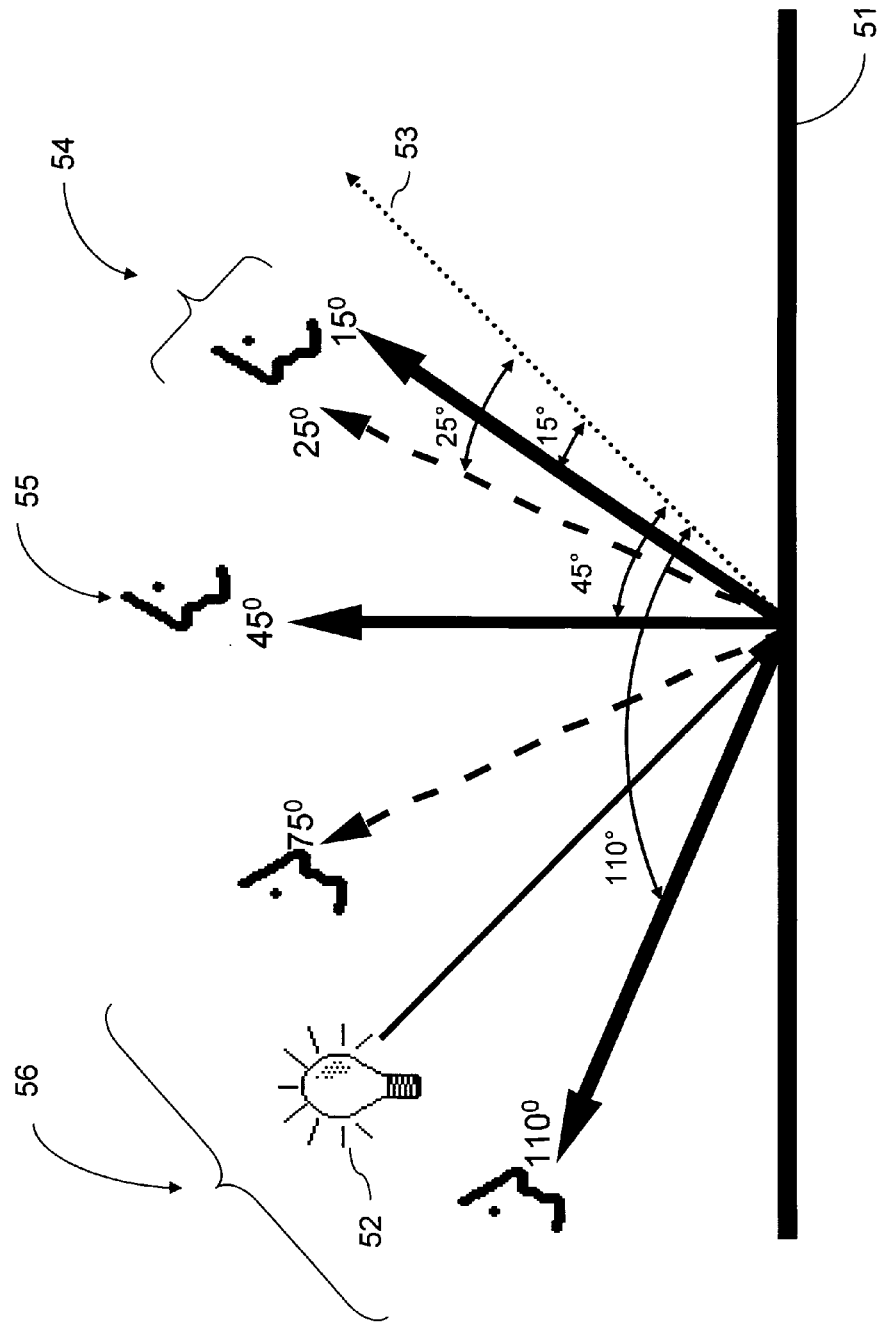
FIG. 5 shows illumination and viewing angles defined in ASTM E2194.

Color and appearance of a coating can vary in relation to illumination. A standard procedure was described in ASTM E-2194, herein incorporated in by references. Briefly, when a coating (51) is illuminated by an illumination source (52), such as a light bulb or sun light, at a given angle as shown in FIG. 5, a number of viewing angles can be used, such as, 1) near aspecular angles (54), that are the viewing angles from about 15° to about 25° from the reflection (53) of the illumination; 2) mid aspecular angles (55), that are the viewing angles about 45° from the reflection (53) of the illumination; and 3) far aspecular angles (56), that are the viewing angles from about 75° to about 110° from the reflection (53) of the illumination. In general, color appears to be slightly brighter at near aspecular angles and slightly darker at far aspecular angles.

Images can be displayed at one or more aspecular angles, typically at three to five different angles. In one example, each of the individual matching images can be displayed at three pre-determined aspecular angles: a near aspecular angle, such as 15°; a mid aspecular angle, such as 45°; and a far aspecular angle, such as 110°. The images can also be displayed at other pre-determined angles or combination of angles, such as a combination of 15°, 45° and 75°, or a combination of 25°, 45° and 75°.

For solid colors, i.e., colors containing no flakes, pearl or other effect pigments, corresponding color images can be displayed regardless of aspecular angles.

Methods for displaying color and appearance of a coating at one or more aspecular angles are described in aforementioned U.S. patent application Ser. No. 11/588,471, which is incorporated by reference.

In step (e), one or more matching formulas are selected (118) from the preliminary matching formulas by comparing the individual matching image and the target coating. With the individual matching images displayed, either one at a time or a plurality of images displayed simultaneously, on a display device, such as a handheld display device, for example a PDA, a laptop or a tablet computer, a refinisher or those skilled in the art can easily compare the matching images with the target coating of the vehicle. Based on the comparison between the individual matching images and the target coating of the vehicle, a selection of the matching formula or a plurality of matching formulas (120) can be made and recorded.

Once the matching formula is selected, the refinisher can prepare a matching coating composition according to the matching formula and repair the coating damage using the matching coating composition according to methods and processes well known to those skilled in the art. This invention provided a method for displaying coating images for selecting one or more matching formulas for matching color and appearance of a target coating of a vehicle. By displaying matching images of coatings, a viewer can expect that the color and the appearance will be suitably representative to that of an actual coating applied to a vehicle or part thereof. This invention thus reduces the needs for repeated testing and trial and increases accuracy of color and appearance match and productivity.

In another embodiment, the method of this invention further comprises the steps of: 1) obtaining color data of the target coating (102, FIG. 1), 2) generating a target image (108, FIG. 1) based on the color data and appearance characteristics stored in the database that are interrelated to the model year and manufacturing site information, and optionally the manufacturing date, and 3) displaying the target image and the individual matching images (113, FIG. 1).

The color data can be obtained by measuring reflectance of a target coating using a color measurement device, such as a colorimeter, a spectrophotometer, or a goniospectrophotometer. Color data may include spectral characteristics such as chroma, hue, lightness, darkness, and the like. Any suitable colorimeter or spectrophotometer, such as Model SP64 manufactured by X-Rite, Grandville, Mich. can be used. Portable spectrophotometers are preferred as they can be readily positioned over coated substrate surfaces of various shapes and sizes. If desired one can measure the reflectance over several portions of the target coating to average out the reflectance of the target coating. Spectral reflectance data can be obtained using spectrophotometer. In a typical spectrophotometer, a light beam of known intensity can be directed towards the target coating and reflectance from the target coating is sequentially measured at least one, preferably at least three, aspecular angles at preset wavelengths. Alternatively, a light beam of known intensity can be sequentially directed at least one, preferably at least three, incident angles towards the target coating and reflectance from the target coating is then measured at preset wavelengths with a single detecting device so as to provide measurements at different aspecular angles, depending on the angle of illumination. A goniospectrophotometer is a spectrophotometer having the capability of measuring with a variety of illuminating and viewing angles using bidirectional geometry. A goniospectrophotometer is also known as multi-angle spectrophotometer. Any suitable Goniospectrophotometers, such as Model MA68II from X-Rite, Grandville, Mich., or the ones provided by Murakami Color Research Laboratory, Tokyo, Japan, or by IsoColor Inc., Carlstadt, N.J., USA, can be used. Gonio-apparent colors should be measured at multiple angles, preferably 3 to 5, or more. For solid colors, a single aspecular angle is sufficient, typically 45 degrees. A common practice for solid colors is to illuminate at a single angle and measure the diffuse reflectance using an integrating sphere, capturing the light reflected at all angles from the target coating. The reverse method of illuminating diffusely and measuring at a single angle yields equivalent results. Diffuse reflectance is preferred when the target coating has a textured surface.

Typically, measurements are taken at 10 nm wavelength intervals from 400 nm to 700 nm wavelengths. A plot of the percent reflectance as a function of wavelength is referred to as a "spectral curve" or spectral reflectance data. For a solid color (non-flake or non-gonioapparent color, such as that lacking metallic flakes), one spectral curve is typically sufficient to measure solid color properties. Other common geometries of measurement are diffuse illumination with 0° or 8° viewing or the reverse. If a target coating having flakes, i.e., gonioapparent color is being matched, reflectance measurements at additional angles would be necessary. ASTM E-2194 recommends three angles, 15°, 45°, and 110° as measured away from the aspecular reflection (FIG. 5). DIN 6175-2 recommends up to five angles, all within this same range of angles. The X-Rite MA68II can provide measurements at 15°, 25°, 45°, 75°, and 110°. The measurement data or spectral reflectance data can be converted into L*,a*,b* or L,C,h values as described in detail in U.S. Patent publication No. 2006/0181707, which is herein incorporated by reference.

An image of the target coating, hereafter referred to as a target image, can be generated based on the color data and appearance characteristics stored in the aforementioned database (105) that comprises interrelated refinish coating formulas, manufacturer's paint codes, color and appearance characteristics, and alphanumeric characters assigned to each of the refinish coating formulas that indicate the model year and manufacturing site information, and optionally manufacturing date for which the refinish coating formulas are applicable. The appearance characteristics can be retrieved by using the vehicle identification information or part thereof, such as the model year and manufacturing site information, and optionally manufacturing date. The appearance characteristics retrieved can provide information such as flake size, type or ratio of different flakes if a mixture of different flakes is present. The appearance characteristics and the color data can be implemented into the algorithms described in aforementioned U.S. patent application Ser. No. 11/588,471 to generate the target image. Both the target image and the aforementioned individual matching images can be displayed (113, FIG. 1) on the display device. The target image can also be generated as a realistic target image representing multiple viewing angles (109, FIG. 1) and then displayed (116, FIG. 1).

Figure 2:
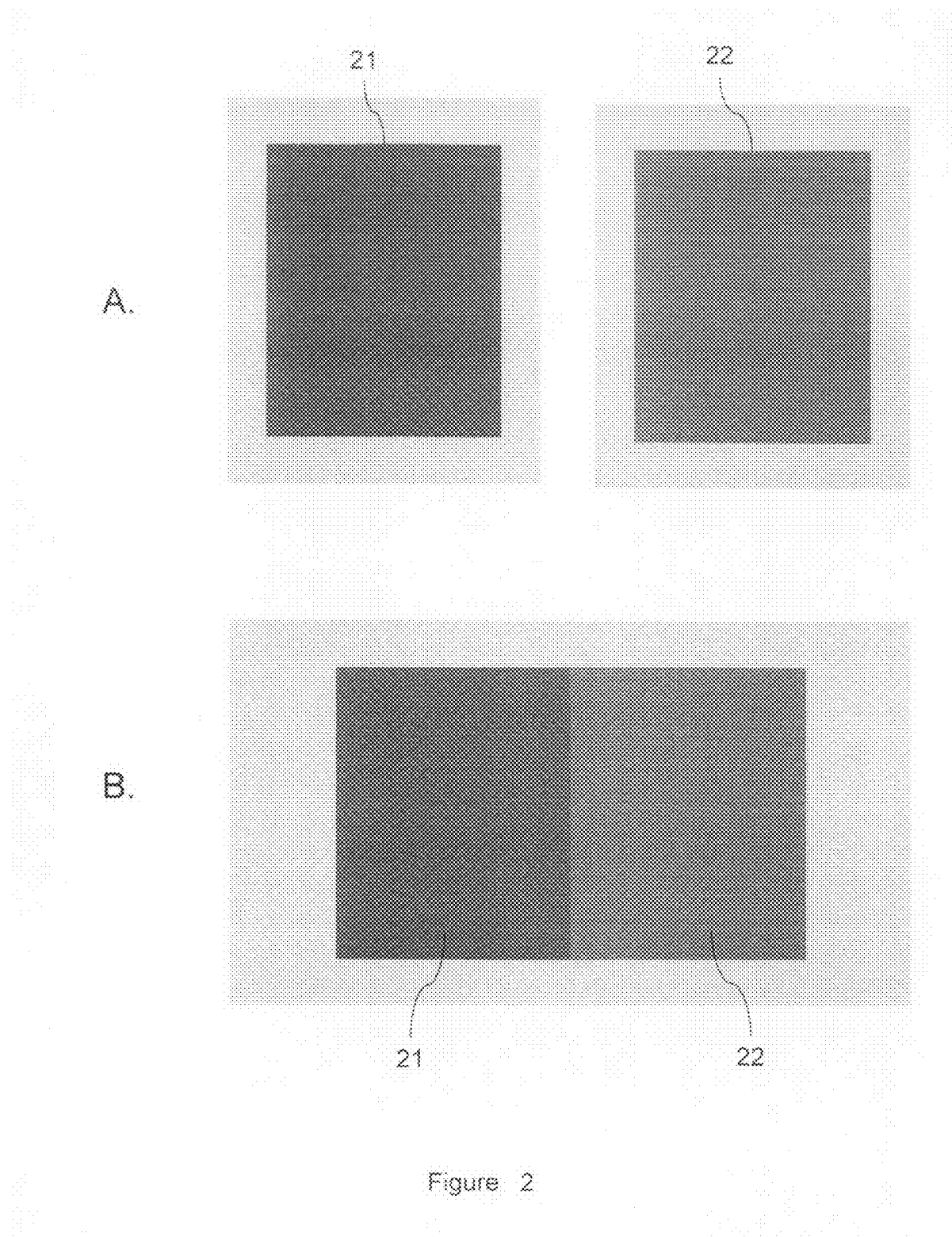
FIG. 2 shows schematic representations of digital color display. (A) Images of a target color and a matching color are shown side by side, but not immediately adjacent to each other. (B) Images of a target color and a matching color are shown immediately adjacent to each other.
Figure 3:
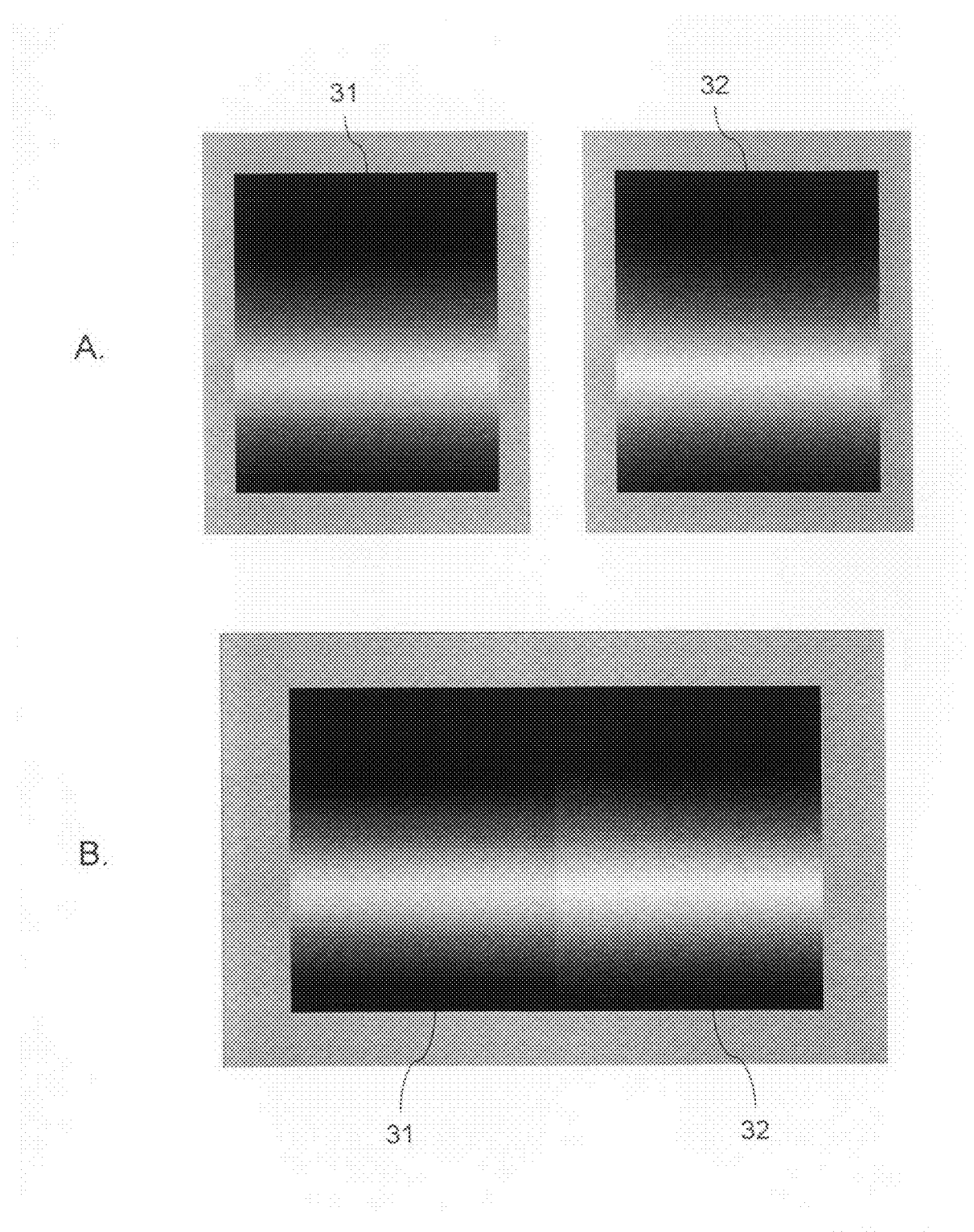
FIG. 3 shows representations of digital display of color and flake appearance of coatings. (A) Images of a target coating and a matching coating are shown side by side, but not immediately adjacent to each other. Images represent colors and flake appearances of the coatings in a curved view. (B) Images of a target coating and a matching coating are shown immediately adjacent to each other.

Each of the matching images can be displayed as an image representing a single viewing angle (22, FIG. 2A) or a realistic matching image, such as a curved view 32 shown in FIG. 3A. The target image can also be displayed as an image representing a single viewing angle (21, FIG. 2A) or as a realistic target image representing multiple viewing angles (31, FIG. 3A).

Figure 6:
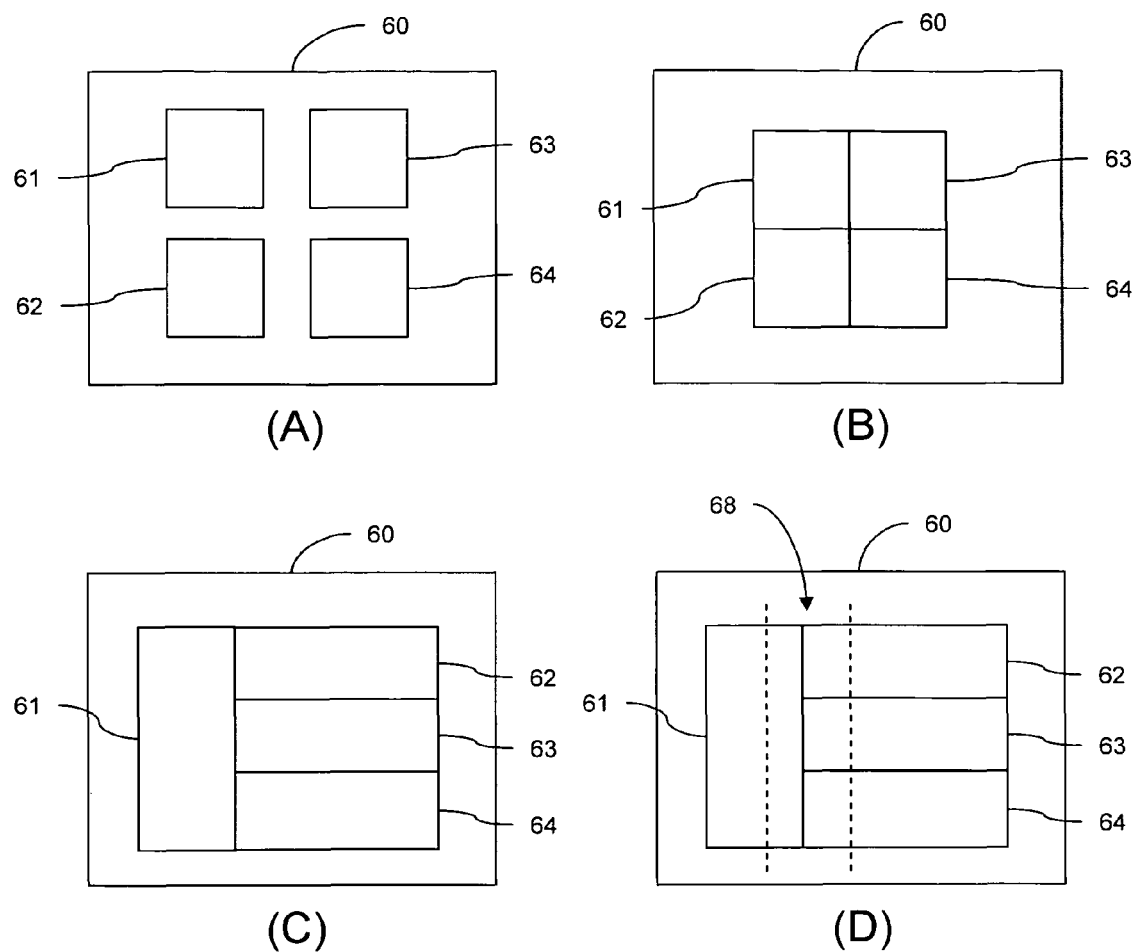
FIG. 6 shows representative display arrangements. (A) Schematic presentation of images of a target coating and one or more matching coatings displayed close to each other. (B) Schematic presentation of images displayed immediately adjacent to each other so that one image can have common boarders with two or more other images. (C) Schematic presentation of images displayed immediately adjacent to each other so that one image can have common boarders with three or more other images. (D) Schematic presentation of images displayed immediately adjacent to each other so that one image can blend into three or more other images. (E) Schematic presentation of images displayed immediately adjacent to each other so that one image can have common boarders with a plurality of other images. (F) Schematic presentation of images displayed immediately adjacent to each other so that one image can blend into a plurality of other images. (G) Schematic presentation of images displayed on top of each other. (H) Schematic presentation of images displayed on top of each other and blended.
Figure 6:
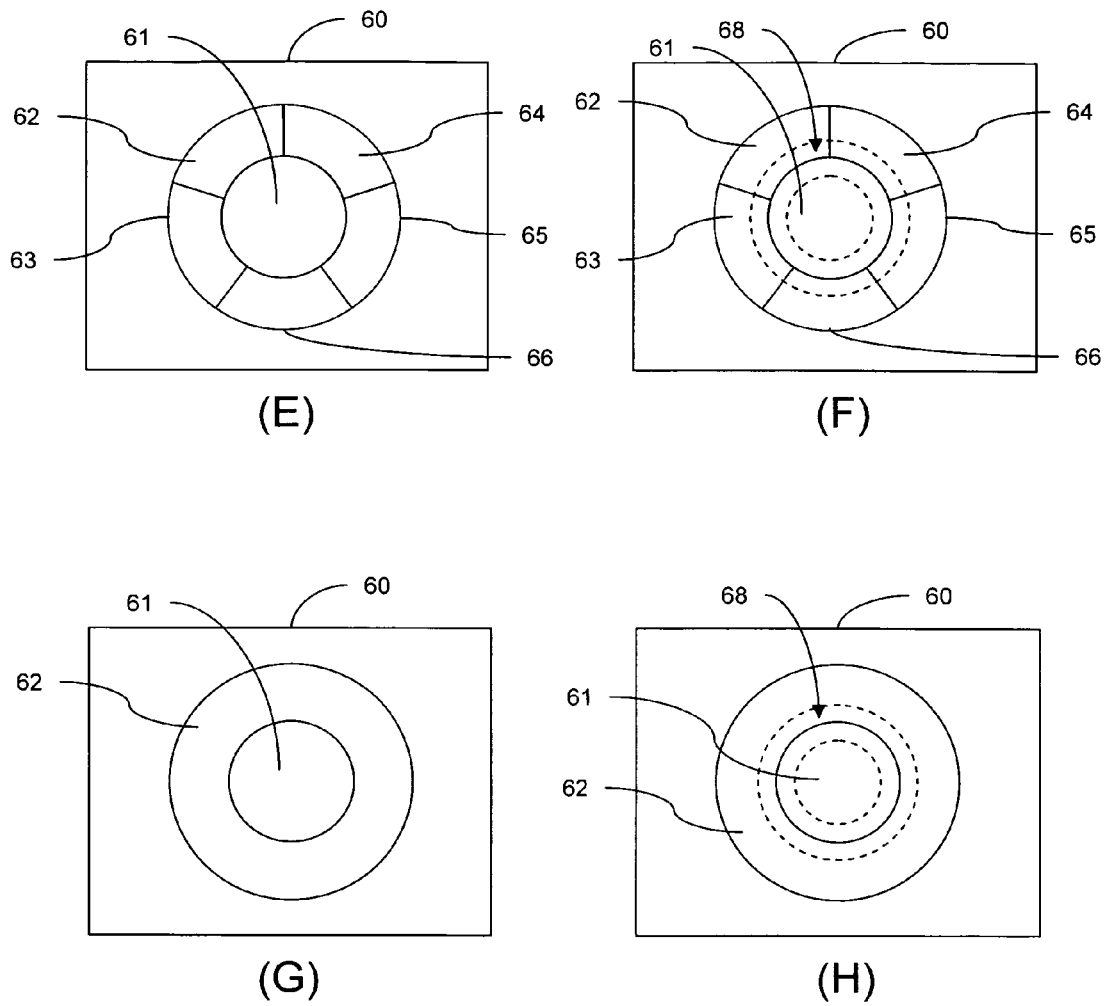
Figure 7A:
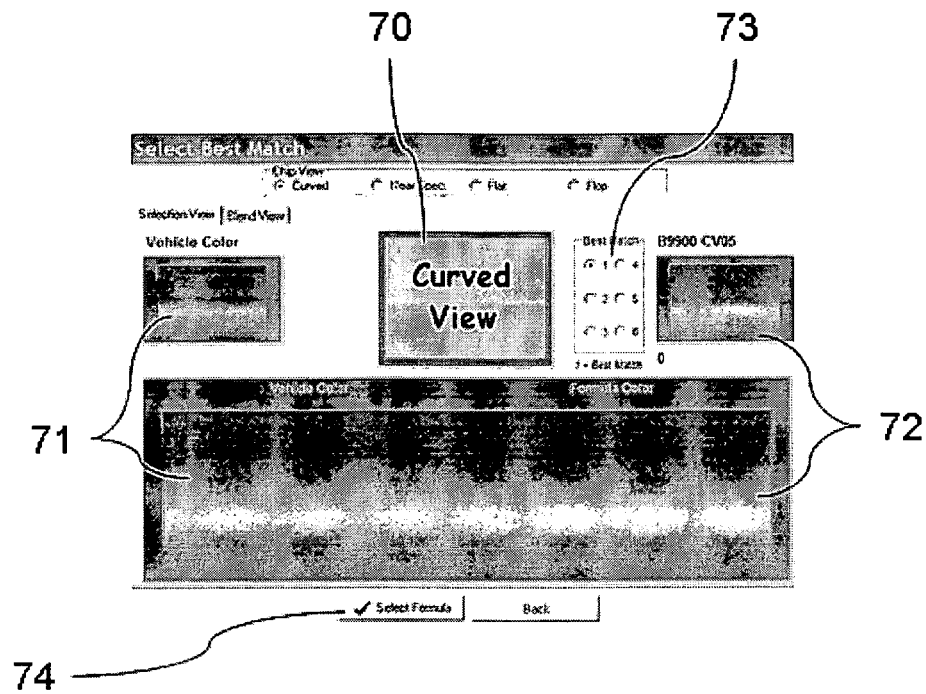
FIG. 7 shows representations of digital display of a target coating and a matching coating in different form a and at different viewing angles. (A) Images displayed in curved view. (B) Images displayed at a near aspecular angle. (C) Images displayed at a mid aspecular angle. (D) Images displayed at a far aspecular angle.
Figure 7B:
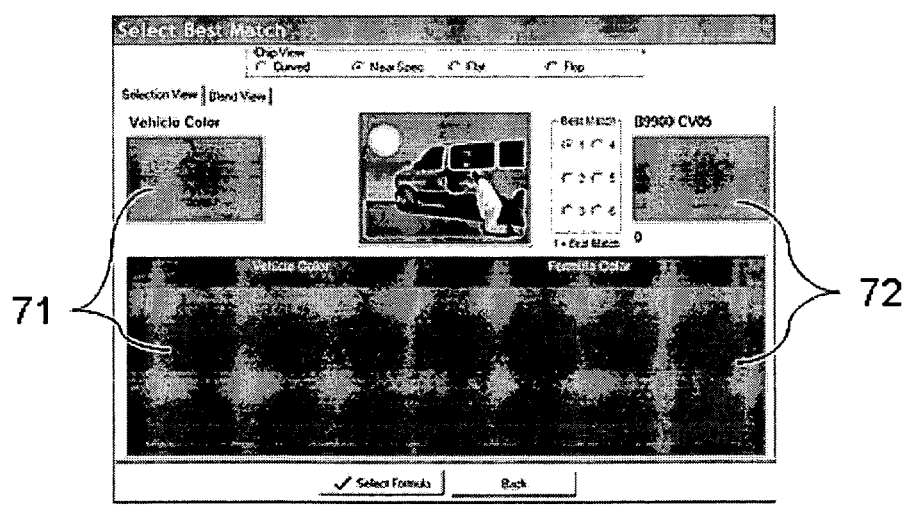
Figure 7C:
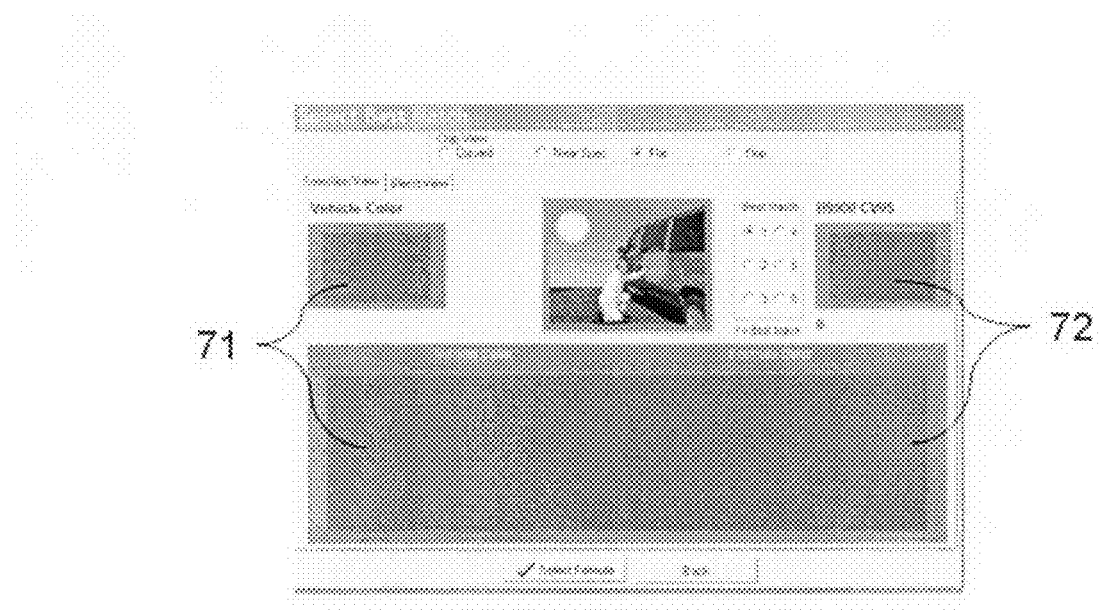
Figure 7D:
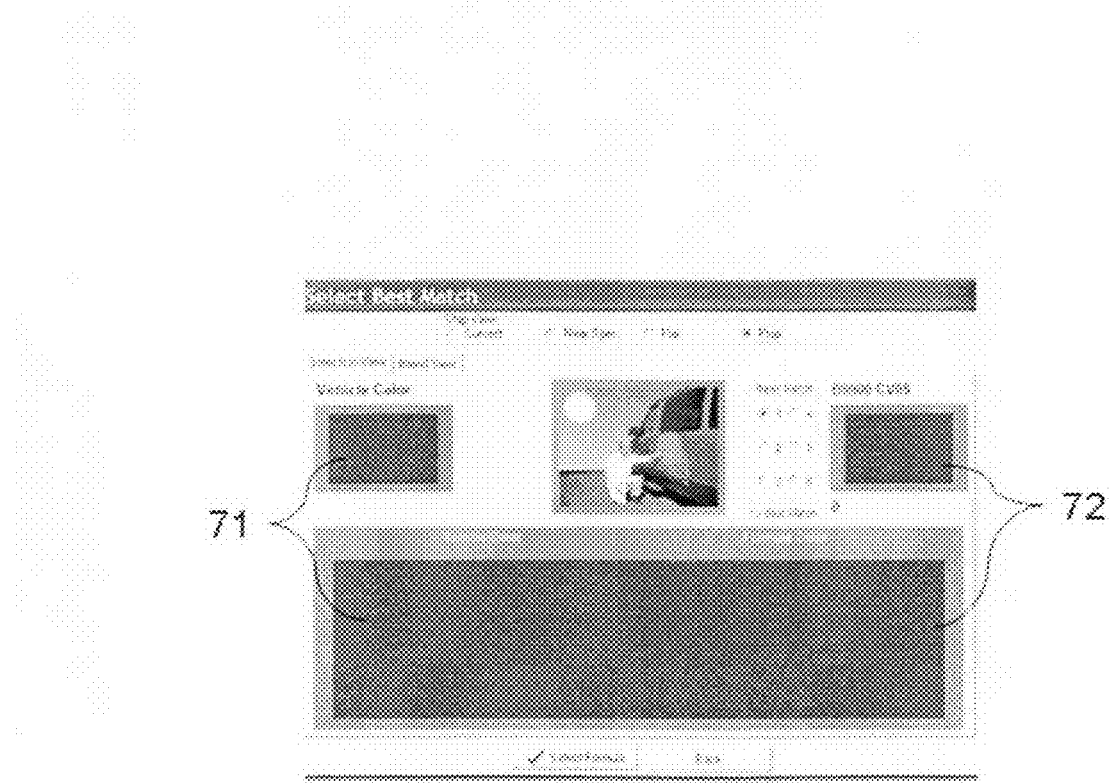

The target image and each of the matching images can be displayed close to each other such as shown in FIG. 2A and FIG. 3A, or displayed immediately adjacent to each other so that the target image can have common boarders with one or more matching images, such as shown in FIG. 2B and FIG. 3B. Images can also be displayed in other arrangements or configurations. Some examples are shown in FIG. 6.

Figure 4A:
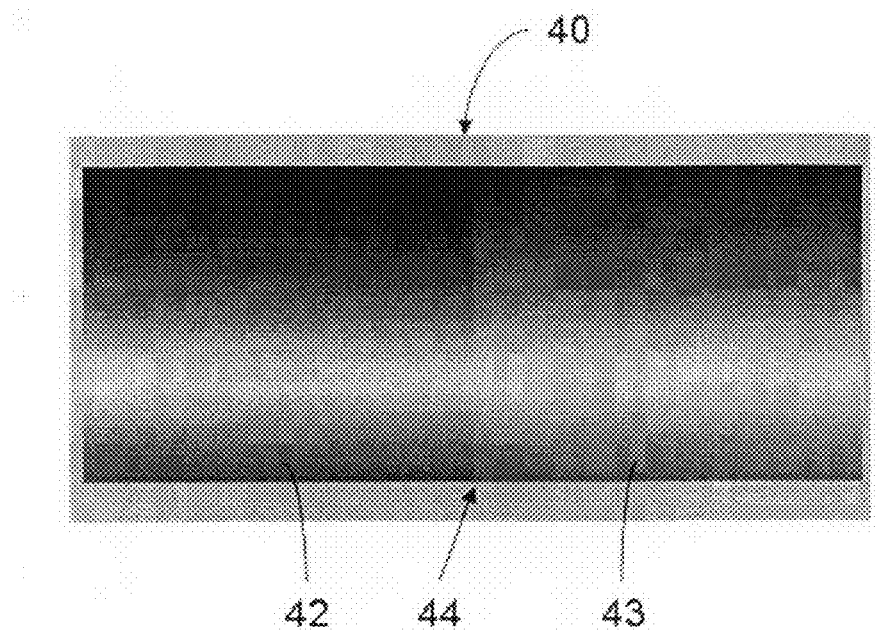
FIG. 4 shows representations of digital display of blending colors and appearances of a target coating and a matching coating. (A) Images of a target coating and a matching coating are shown immediately adjacent to each other. Images represent colors and flake appearances of the coatings in a curved view. (B) Images of a target coating and a matching coating are shown to have about 30% area blending into each other.
Figure 4B:
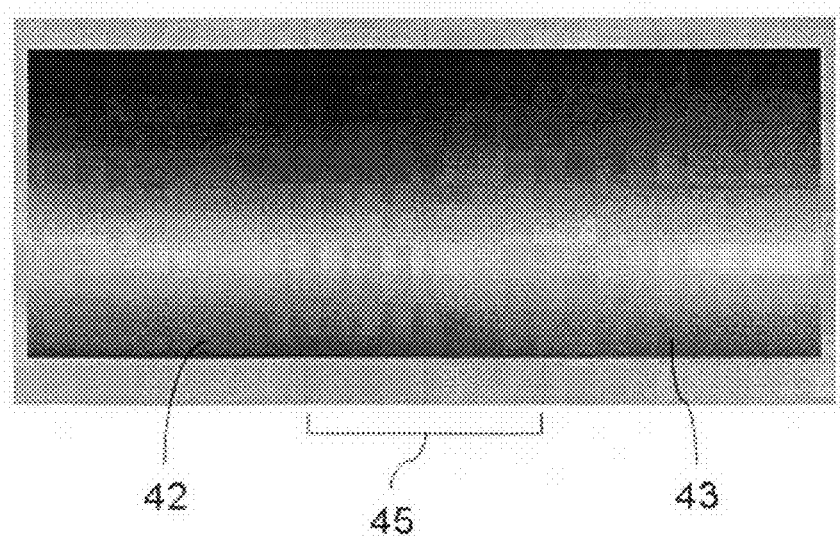

In yet another embodiment, the method of this invention further comprises the steps of generating simulated individual blending images (110, FIG. 1) based on the target image and each of the individual matching images and displaying the blending images (114). Each of the blending images can also be generated as a realistic blending image (111, FIG. 1) representing multiple viewing angles and displayed (115, FIG. 1). A simulated individual blending image can be generated by calculating the R, G, B values required to render the two coatings to be blended, such as that of the target coating and one of the matching formulas. In brief, color values, such as XYZ values of the target coating and one of the matching formulas are interpolated in a linear or non-linear function to simulate various degrees of blend and different blending scenarios, and the interpolated XYZ values are then rendered into R, G, B values to generate and display the blending image. The blending images can be displayed as a representation of a single viewing angle or as a representation of realistic image reflecting multiple view angles such as a curved view. Examples of blending images in curved view are shown in FIG. 4. In FIG. 4A, a target image (42) and a matching image (43) are shown immediately adjacent to each other in a display area (40) on a display device wherein the two images have a common boarder (44). In FIG. 4B, the two images are blending together in a blending region (45). The blending region can be specified. Typically, the blending region can be about 10% to 90%, preferably 20% to 60%, further preferably 20% to 40% of each of the two images to be blended. The blending image can further be displayed at pre-determined aspecular angles selected from a near aspecular angle, a mid aspecular angle, a far aspecular angle, or a combination thereof.

In yet another embodiment, in addition to aforementioned, the method of this invention further comprises the steps of: 1) obtaining appearance data of the target coating (103, FIG. 1), 2) generating a target image based on the color data and the appearance data, 3) displaying the target image and individual matching images.

Appearance data of the target coating can be generated using methods described below. In one example, the appearance data can be obtained by capturing one or more appearance images of the target coating, such as a vehicle body or part thereof, using an imaging device and subsequent measurement of the appearance images using a computing device. The appearance images of the target coating can be still images or video images. Both still images and video images are suitable for this invention. In another example, appearance data are generated by an appearance measurement device and stored as non-image electronic files. Examples of such non-image electronic files include, but not limited to, numerical, textual or alphanumerical data files correlating positions and reflectance intensity at each of the positions. Image and non-image data files can be converted to each other according to well known methods. Methods described in aforementioned U.S. Pat. No. 6,952,265 are suitable for this invention. Other methods for obtaining appearance data of a coating are also suitable for this invention, such as the ones described in a commonly owned U.S. Patent Application No. 60/848,757, filed on Oct. 2, 2006, which is incorporated by reference.

In yet another embodiment, in addition to aforementioned, the method of this invention further comprises the steps of generating blending images of the target image and the individual matching images and displaying the blending images on a display device, wherein the target image is generated based on the color data and appearance data of the target coating.

A number of arrangements can be made to display images on the display device. The images can be displayed close to each other such as shown in FIG. 2A and FIG. 3A, or displayed immediately adjacent to each other so that one image, such as the target image, can have common boarders with one or more other images, such as the matching images as shown in FIG. 2B and FIG. 3B. Additional possible arrangements are schematically shown in FIG. 6. For example, the target image (61) can be displayed in a display area (60) of a display device adjacent, but not in direct contact with one or more individual matching images (62, 63, and 64) (FIG. 6 A). It is understood that various modifications or re-arrangement can be made to display the images without departing from the scope and spirit of this invention. The target image can also be arranged to have direct contact with one or more matching images such as shown in FIG. 6 B in that the target image (61) has common boarders and in direct contact with two matching images (62, and 63). The target image may have direct contact with three or more matching image (FIG. 6 C) and have blending region (68) between the target image and each of the matching images (FIG. 6 D). Another example of the arrangement is shown in FIGS. 6 E and F in that the target coating (61) is surrounded by more than one individual matching images (62-66) and can have a blending region (68). The target image (61) can also be surrounded by a single matching image (62) and having a blending region (68) (FIGS. 6 G and H).

Figure 1C:
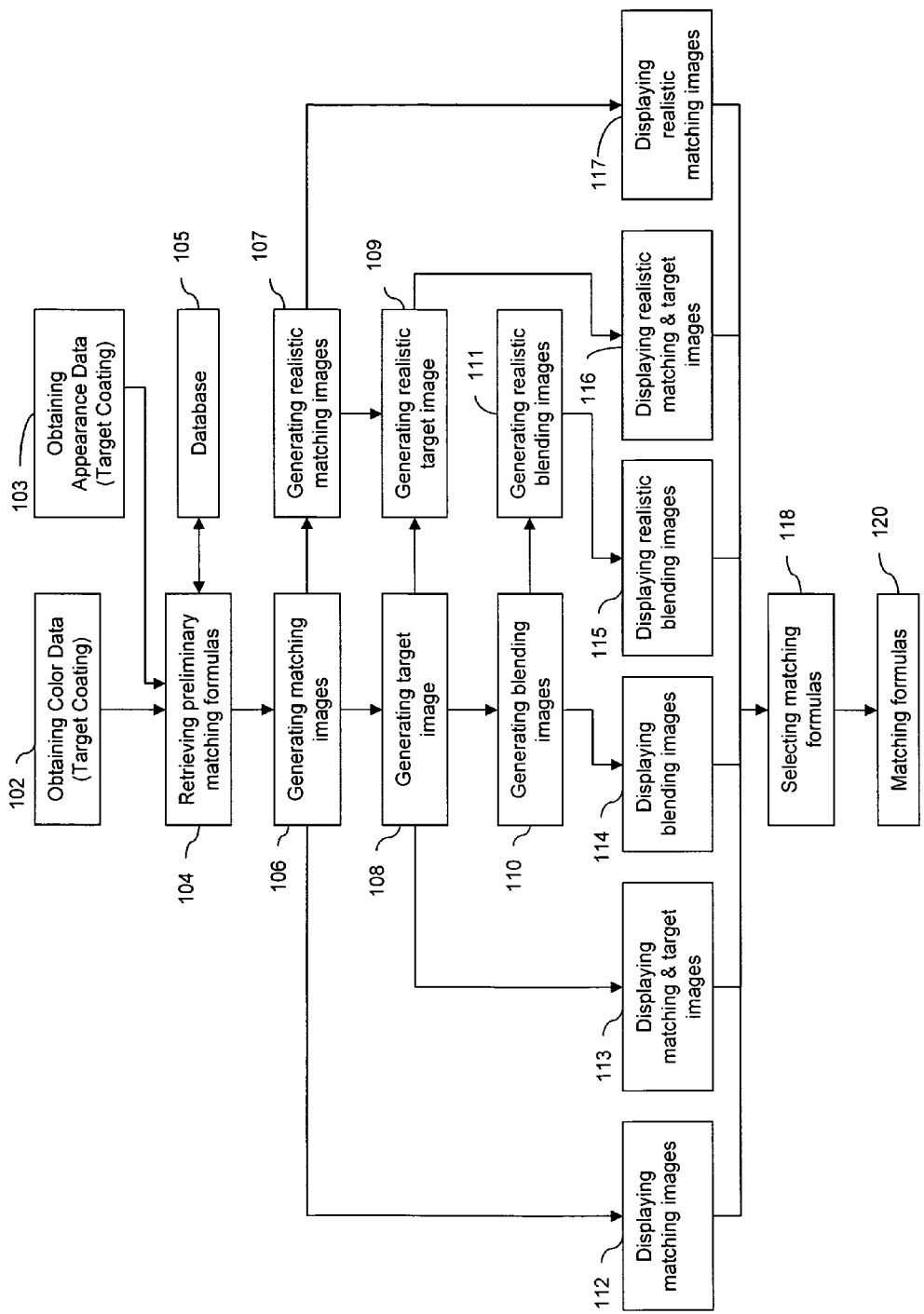

In yet another embodiment, the method of this invention comprises the following steps wherein identification information of the article is not required. A representative process flow chart is shown in FIG. 1C.

In step (a) of this embodiment, one or more preliminary matching formulas are retrieved from a database that comprises interrelated repair formulas, color characteristics, and optionally appearance characteristics. The preliminary matching formulas can be retrieved manually by those skilled in the art. For example, a skilled refinisher can identify a number of blue color coating formulas with varying shades that can potentially match a blue color of a classic vehicle wherein no vehicle identification number is available for that vehicle. Preliminary formulas for those blue colors can be retrieved by that skilled refinisher by using descriptions such as a color name or a color code.

In step (b) of this embodiment, individual matching images are generated based on the color characteristics, and optionally the appearance characteristics, interrelated to each of the preliminary matching formulas.

In step (c) of this embodiment, the individual matching images are displayed on a display device. The matching images can be displayed as realistic matching images. The realistic matching images can further be displayed at one or more pre-determined aspecular angles.

In step (d) of this embodiment, the matching formulas are selected from the preliminary matching formulas by comparing the individual matching images and the color and appearance of the article.

In a variation of this embodiment, the method of this invention further comprises the steps of obtaining color data, and optionally appearance data of the article; generating a target image based on the color data, and optionally the appearance data; and displaying the target image on the display device. The individual matching images and the target image can be displayed as realistic matching images and realistic target image, respectively. The realistic images can further be displayed at one or more pre-determined aspecular angles. Selection of the matching formulas in this embodiment can be based on the comparison of the individual matching images and the target image, or the comparison of the realistic matching images and the realistic target image. The preliminary matching formulas can also be retrieved by using color data, appearance data, or both the color and appearance data.

This invention is particularly directed to a system for displaying one or more images to select one or more matching formulas to match color and appearance of an article, particularly, to match the coating of a vehicle.

In one embodiment, said system comprises:
 a) a computing device;
 b) a display device;
 c) one or more data input devices;
 d) a database comprising interrelated repair formulas, color characteristics, and optionally appearance characteristics; and
 e) a computer program product that is accessible to the computing device and performs a computing process comprising the steps of:
  i. retrieving one or more preliminary matching formulas from the database based on signals received from the data input device;
  ii. generating individual matching images based on the color characteristics, and optionally appearance characteristics interrelated to each of the preliminary matching formulas; and
  iii. displaying the individual matching images on the display device.

The signals received from the input device can be entered by an operator. For example, a skilled refinisher can identify a number of blue color coating formulas with varying shades that can potentially match a blue color of a classic vehicle wherein no vehicle identification number is available for that vehicle. Preliminary formulas for those blue colors can be retrieved by entering into the computing device via the input device either formula numbers or names, color names or numbers, make of the vehicle, vehicle manufacturing year, or a combination thereof, as known to those skilled in the art.

In another embodiment, the system comprises:
 a) a computing device;
 b) a display device;
 c) one or more data input devices;
 d) a database comprising interrelated repair formulas, identification information of articles, color characteristics, and optionally appearance characteristics; and
 e) a computer program product that is accessible to the computing device and performs a computing process comprising the steps of:
  i. receiving from the one or more input devices identification information of the article;
  ii. retrieving one or more preliminary matching formulas from the database that match the identification information;
  iii. generating individual matching images based on the color characteristics, and optionally appearance characteristics interrelated to each of the preliminary matching formulas; and
  iv. displaying the individual matching images on the display device.

The identification information of the article can be selected from, for example, a catalog number for the article, a name or part of the name of the article, or a combination thereof. In the case for a vehicle, the identification information can be model year, manufacturing site information, manufacturer's paint code, optionally manufacturing date for said vehicle, or a combination thereof. The identification information can also be a vehicle identification number (VIN), or a part thereof. The identification information is stored in the database interrelated to other information such as repair formulas, color characteristics, and optionally appearance characteristics.

Any of the aforementioned computing devices are suitable for this invention. A portable computing device is preferred. The computing device can also be a client computer connected to a host computer via a wired or wireless network.

The computing program product can be functionally accessible to the computing device and can reside in the computing device or in the host computer, or both the computing device and the host computer.

The data input device can be selected from a digital input device, such as a wired keyboard, a wireless keyboard, a digital writing pad, a touch screen, an input portal that can be connected to a electrical device or another computer, or any other digital devices that can input data into the computing device; an optical input device, such as a barcode reader, a scanner, a digital camera, a digital video camera, or any other optical devices that can input data into the computing device; an electromagnetic input device, such as a radio receiver, an RFID (radio frequency identification) receiver, an infrared data receiver, or any other devices that can receive data through a broad range of electromagnetic wavelengths; or a combination thereof. Each of the data input devices may further require necessary adaptors or couplings in order to input data into the computing device, wherein those adaptors or couplings can be readily determined by those skilled in the art. Those adaptors or couplings can further be wired or wireless.

The display device can be selected from a digital display device, such as a computer monitor, a PDA, a computer, a cell phone, a smart phone, or a TV; an optical display device, such as a projector; a print display, such as a printer; or a combination thereof. The display device can also be a duel functional display/data input device. One example of such duel functional device is a touch screen of a computer or a PDA.

The color measuring device can be a colorimeter, a spectrophotometer, or a goniospectrophotometer. Any suitable calorimeter or spectrophotometer, such as Model SP64 manufactured by X-Rite, Grandville, Mich. can be used. A goniospectrophotometer is also known as multi-angle spectrophotometer. Any suitable Goniospectrophotometers, such as Model MA68II from X-Rite, Grandville, Mich., or the ones provided by Murakami Color Research Laboratory, Tokyo, Japan, or by IsoColor Inc., Carlstadt, N.J., USA, can be used.

The computer program product can further comprise the steps of generating and displaying realistic matching images based on the individual matching images and realistic target image based on the target image. The realistic matching images or the realistic target image can be displayed at one or more pre-determined aspecular angles. Simulated individual blending images based on the target image and each of the individual matching images can also be generated and displayed.

The appearance measuring device can comprise an imaging device for capturing one or more appearance images of the target coating, a computing device and a computer program product residing in the computing device for generating appearance data from the appearance images. An imaging device refers to a device that can capture images under a wide range of electromagnetic wavelengths including visible or invisible wavelengths. Aforementioned imaging devices, such as a still film optical camera, a digital camera, an X-Ray camera, an infrared camera, an analog video camera, and a digital video camera are suitable for this invention. Computer program products based on the methods described in aforementioned U.S. Pat. No. 6,952,265 or U.S. Patent Application No. 60/848,757, filed on Oct. 2, 2006, are suitable for this invention.

The computer program product can further comprise the steps of generating and displaying realistic matching images based on the individual matching images and realistic target image based on the target image. The realistic matching images or the realistic target image can be displayed at one or more pre-determined aspecular angles. Simulated individual blending images based on the realistic target image and each of the individual realistic matching images can also be generated and displayed.

Figure 8A:
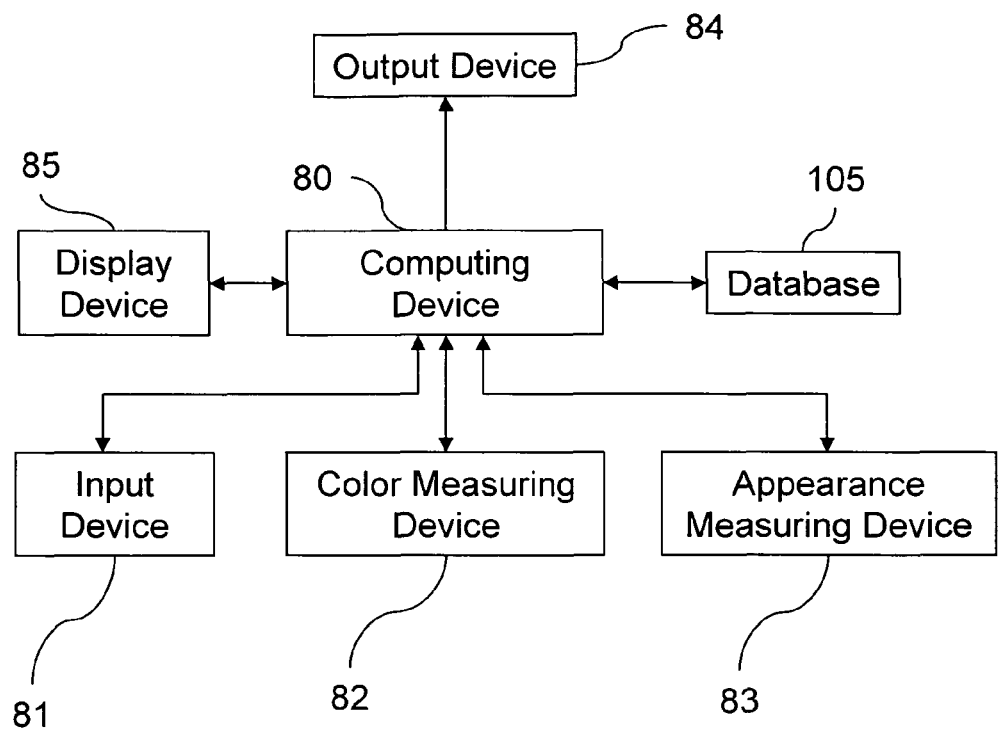
FIG. 8 shows a representative hardware configuration of the system of this invention.

A representative hardware configuration of the system of this invention is shown in FIG. 8A, wherein the system comprises a computing device (80); a display devise (85), such as a monitor screen; a database (105); one or more data input devices (81). Examples of the input devices include, but not limited to, a wired or wireless keyboard, a touch screen, a barcode reader or a scanner. One or more input devices can be functionally coupled to the computing device as determined necessary by those skilled in the art. The system can further comprise a color measuring device (82), and optionally an appearance measuring device (83). The system can further comprise an output device (84). The output device can be a printer, a monitor screen or a data output portal that can output data such as selected formulas. The output device can be further coupled to other computing devices or databases or a mixing device that can mix coating compositions according to the selected formulas. The input device, the output device, the color measuring device, or the appearance measuring device can be functionally connected to the computing device through wired or wireless connections. The computing device can have database (105) loaded into its storage such as a hard drive or a memory card of the computing device. The database can also be accessed from the computing device through wired or wireless connections.

Figure 8B:
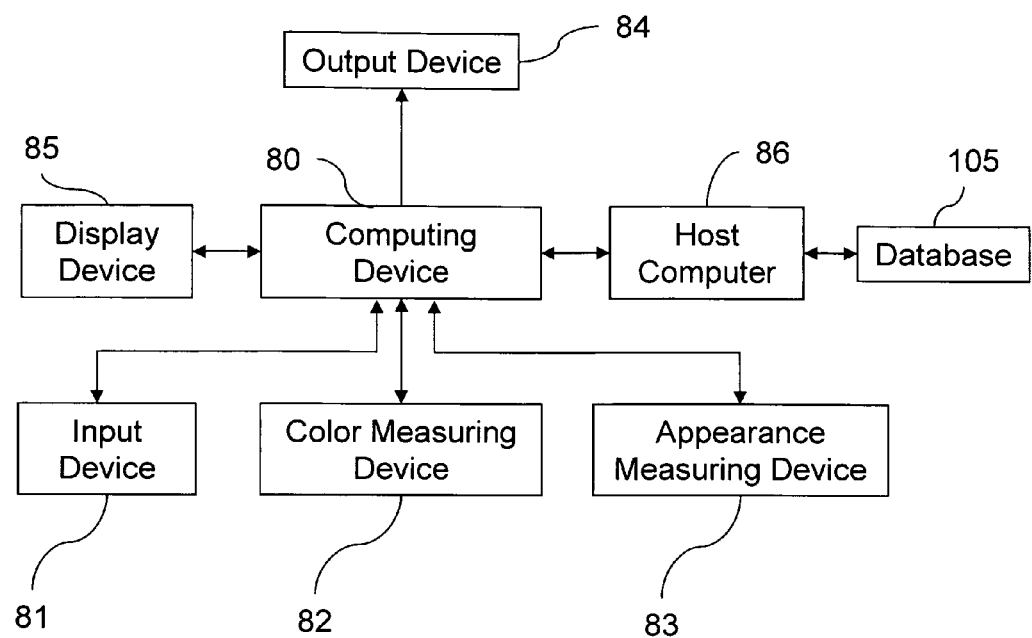

In another configuration of the system (FIG. 8B), computing device (80) is connected to a host computer (86) via a wired or wireless network.

Although vehicle and vehicle coating are specifically described, this invention can also be used for other coated articles or article without coating wherein color or appearance of the articles can be identified by article identification information, such as catalog numbers or color codes. Some examples of such coated articles include, but not limited to: home appliances, such as refrigerator, washing machine, dishwasher, microwave ovens, cooking and baking ovens; electronic appliances, such as television sets, computers, electronic game sets, audio and video equipments; recreational equipments, such as bicycles, ski equipments, all terrain vehicles; and home or office furniture, such as tables, file cabinets. Examples of articles without coating that have color and appearance include, but not limited to, engineering polymers, injection molding plastics or polymers, or other synthetic materials such as Corian® available from DuPont, wherein Corian® is a registered trademark of DuPont. Selection of matching formulas for repairing the coatings of the articles or articles without coating can be performed according to the method of this invention.

This invention can also be used for articles wherein color or appearance of the articles can be identified without article identification information. Examples of articles without article identification information include, but not limited to, a vehicle at some points of OEM production line wherein a vehicle identification number has not yet been assigned, a vehicle wherein a vehicle identification number is not available, or a piece of kitchen counter top wherein identification information is not available. The color data, the appearance data, or both the color and the appearance data can be obtained by measurements using any of the applicable aforementioned methods. One or more repair formulas, such as preliminary matching formulas can be retrieved manually by those skilled in the art. Repair formulas can also be retrieved by using the color data, the appearance data, or both the color and the appearance data. Each of the retrieved repair formulas can be interrelated to color characteristics, appearance characteristics, or both the color and appearance characteristics. Matching images or realistic matching images can be generated based on color characteristics, and optionally the appearance characteristics. The matching images or realistic matching images can be displayed on a display device and one or more matching formulas can be selected from the preliminary matching formulas based on the comparison of the matching images and the article. The realistic matching images can also be displayed at one or more pre-determined aspecular angles. A target image can be generated and displayed, or further displayed as a realistic target image and the realistic target images can also be displayed at one or more pre-determined aspecular angles.

Since color of an article may have been changed after its being manufactured due to weathering or wear, the original manufacturing (OEM) color standard may not match the article that is in need of repair. One advantage of using the combination of measured color data and the stored appearance characteristics is that color can be adjusted to match the article in need of repair.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

A GMC Cadillac vehicle had a coating damage needing repair. The coating of the vehicle was metallic. The manufacturing year for the vehicle was 2003 and paint code for the vehicle coating was 12. The information mentioned above was entered into a computer. Vehicle identification number (VIN) was read from the vehicle VIN label affixed to the vehicle by using a barcode reader and entered into the computer via a wireless connection. Color data of the vehicle coating was obtained by using a a goniospectrophotometer Model MA68II, manufactured by X-Rite, Grandville, Mich. The color data were imported into the computer via a wired connection. The color data can also be imported into the computer via a wireless connection.

The vehicle identification number was parsed by a computer implemented process to extract model year and manufacturing site information which was used together with the paint code to retrieve preliminary matching formulas from ColorNet database systems, available from DuPont. Individual matching images were generated based the preliminary matching formulas. Target Image of the vehicle coating was generated based on the color data and appearance characteristics stored in the database.

The target image and one of the individual matching images were displayed on a computer screen. A typical screenshot is shown in FIG. 7. The screenshot comprises the following areas: areas for displaying the target image representing the coating of the vehicle (71), areas for displaying the target image representing the coating of the vehicle (72), areas for identifying how the images are displayed (70) and areas to select which preliminary matching formula is to be displayed (73).

Images were displayed in different views as illustrated in FIG. 7: (A) the target and one matching image were displayed in curved view, (B) the target and one matching image were displayed at 15°, a near aspecular angle, (C) the target and one matching image were displayed at 45°, a mid aspecular angle, (D) the target and one matching image were displayed at 110°, a far aspecular angle.

The preliminary matching formula No. 1 had very close match in color and flake appearance in a curved view and at the near aspecular angle. The color was slightly darker than the vehicle coating at the far aspecular angle. The color and appearance match was determined as satisfactory by commonly accepted industry standard. The formula No. 1 was selected by clicking on the button (74) as the matching formula for repairing the coating damage of the vehicle.

What is claimed is:

1. A system for displaying one or more images to select one or more matching formulas to match color and appearance of an article, said system comprising:
   a) a computing device;
   b) a display device;
   c) one or more data input devices;
   d) a database comprising interrelated repair formulas, color characteristics, and optionally appearance characteristics; and
   e) a computer program product that is accessible to the computing device and performs a computing process comprising the steps of:
      i. retrieving one or more preliminary matching formulas from the database based on signals received from the data input device;
      ii. generating individual matching images having R,G,B values based on the color characteristics, and optionally appearance characteristics interrelated to each of the preliminary matching formulas; and
      iii. displaying the individual matching images having said R,G,B values on the display device.

2. The system of claim 1, wherein the computing device is a portable computing device.

3. The system of claim 1, wherein the computing device is connected to a host computer via a wired or wireless network.

4. The system of claim 1, wherein the display device is selected from a digital display device, an optical display device, a print display device, or a combination thereof.

5. The system of claim 1, wherein the data input device is selected from a digital input device, an optical input device, an electromagnetic input device, or a combination thereof.

6. The system of claim 1, wherein each of the individual matching images is displayed as realistic matching image.

7. The system of claim 1 further comprising a color measuring device functionally coupled to the computing device for obtaining color data of the article, and optionally an appearance measuring device functionally coupled to the computing device for obtaining appearance data of the article, wherein the computing process further comprises the steps of: receiving the color data; generating a target image of the article having R,G,B values based on the color data, and optionally based on the appearance data; and displaying the target image on the display device.

8. The system of claim 7, wherein the color measuring device is selected from a colorimeter, a spectrophotometer, or a goniospectrophotometer.

9. The system of claim 7, wherein the appearance measuring device comprises an imaging device.

10. A system for displaying one or more images to select one or more matching formulas to match color and appearance of an article, said system comprising:
    a) a computing device;
    b) a display device;

c) one or more data input devices;
d) a database comprising interrelated repair formulas, identification information of articles, color characteristics, and optionally appearance characteristics; and
e) a computer program product that is accessible to the computing device and performs a computing process comprising the steps of:
 i. receiving from the one or more input devices identification information of the article;
 ii. retrieving one or more preliminary matching formulas from the database that match the identification information;
 iii. generating individual matching images having R,G,B values based on the color characteristics, and optionally appearance characteristics interrelated to each of the preliminary matching formulas; and
 iv. displaying the individual matching images having said R,G,B values on the display device.

11. The system of claim 10, wherein the computing device is a portable computing device.

12. The system of claim 10, wherein the computing device is connected to a host computer via a wired or wireless network.

13. The system of claim 10, wherein the display device is selected from a digital display device, an optical display device, a print display device, or a combination thereof.

14. The system of claim 10, wherein the data input device is selected from a digital input device, an optical input device, an electromagnetic input device, or a combination thereof.

15. The system of claim 10, wherein each of the individual matching images is displayed as realistic matching image.

16. The system of claim 10 further comprising a color measuring device functionally coupled to the computing device for obtaining color data of the article, and optionally an appearance measuring device functionally coupled to the computing device for obtaining appearance data of the article, wherein the computing process further comprises the steps of: receiving the color data, and optionally the appearance data; generating a target image of the article having R,G,B values based on the color data, and optionally based on the appearance data; and displaying the target image on the display device.

17. The system of claim 16, wherein the color measuring device is selected from a colorimeter, a spectrophotometer, or a goniospectrophotometer.

18. The system of claim 16, wherein the appearance measuring device comprises an imaging device.

19. A system for displaying one or more images to select one or more matching formulas to match color and appearance of a target coating of an article, said system comprising:
a) a computing device;
b) a display device;
c) one or more data input devices;
d) a database comprising interrelated repair formulas, color characteristics, and optionally appearance characteristics; and
e) a computer program product that is accessible to the computing device and performs a computing process comprising the steps of:
 i. retrieving one or more preliminary matching formulas from the database based on signals received from the data input device;
 ii. generating individual matching images having R,G,B values based on the color characteristics, and optionally appearance characteristics interrelated to each of the preliminary matching formulas; and
 iii. displaying the individual matching images having said R,G,B values on the display device.

20. The system of claim 19, wherein the computing device is a portable computing device.

21. The system of claim 19, wherein the computing device is connected to a host computer via a wired or wireless network.

22. The system of claim 19, wherein the display device is selected from a digital display device, an optical display device, a print display device, or a combination thereof.

23. The system of claim 19, wherein the data input device is selected from a digital input device, an optical input device, an electromagnetic input device, or a combination thereof.

24. The system of claim 19, wherein each of the individual matching images is displayed as realistic matching image.

25. The system of claim 19 further comprising a color measuring device functionally coupled to the computing device for obtaining color data of the article, and optionally an appearance measuring device functionally coupled to the computing device for obtaining appearance data of the article, wherein the computing process further comprises the steps of: receiving the color data, and optionally the appearance data; generating a target image of the article having R,G,B values based on the color data, and optionally based on the appearance data; and displaying the target image on the display device.

26. The system of claim 25, wherein the color measuring device is selected from a colorimeter, a spectrophotometer, or a goniospectrophotometer.

27. The system of claim 25, wherein the appearance measuring device comprises an imaging device.

28. A system for displaying one or more images to select one or more matching formulas to match color and appearance of a target coating of an article, said system comprising:
a) a computing device;
b) a display device;
c) one or more data input devices;
d) a database comprising interrelated repair formulas, identification information of articles, color characteristics, and optionally appearance characteristics; and
e) a computer program product that is accessible to the computing device and performs a computing process comprising the steps of:
 i. receiving from the one or more input devices identification information of the article;
 ii. retrieving one or more preliminary matching formulas from the database that match the identification information;
 iii. generating individual matching images having R,G,B values based on the color characteristics, and optionally appearance characteristics interrelated to each of the preliminary matching formulas; and
 iv. displaying the individual matching images having said R,G,B values on the display device.

29. The system of claim 28, wherein the computing device is a portable computing device.

30. The system of claim 28, wherein the computing device is connected to a host computer via a wired or wireless network.

31. The system of claim 28, wherein the display device is selected from a digital display device, an optical display device, a print display device, or a combination thereof.

32. The system of claim 28, wherein the data input device is selected from a digital input device, an optical input device, an electromagnetic input device, or a combination thereof.

33. The system of claim 28, wherein each of the individual matching images is displayed as realistic matching image.

34. The system of claim 28 further comprising a color measuring device functionally coupled to the computing device for obtaining color data of the article, and optionally an appearance measuring device functionally coupled to the computing device for obtaining appearance data of the article, wherein the computing process further comprises the steps of: receiving the color data, and optionally the appearance data; generating a target image of the article having R,G,B values based on the color data, and optionally based on the appearance data; and displaying the target image on the display device.

35. The system of claim 34, wherein the color measuring device is selected from a colorimeter, a spectrophotometer, or a goniospectrophotometer.

36. The system of claim 34, wherein the appearance measuring device comprises an imaging device.

* * * * *